United States Patent
Oki et al.

(10) Patent No.: US 6,255,380 B1
(45) Date of Patent: Jul. 3, 2001

(54) PRESSURE-RESISTANT, SLIDING TETRAFLUOROETHYLENE RESIN COMPOSITION

(75) Inventors: Yoshio Oki, Yokkaichi; Takuya Ishii, Kuwana; Kenji Ito, Ama-gun; Kohei Yoshino, Iwata, all of (JP)

(73) Assignee: NTN Corporation, Osaka (JP)

(*) Notice: Subject to any disclaimer, the term of this patent is extended or adjusted under 35 U.S.C. 154(b) by 0 days.

(21) Appl. No.: 09/105,854

(22) Filed: Jun. 29, 1998

(30) Foreign Application Priority Data

Jun. 30, 1997 (JP) ................................. 9-174285
Apr. 30, 1998 (JP) ................................ 10-120844

(51) Int. Cl.$^7$ .................................... C08J 55/00
(52) U.S. Cl. ...................... 524/520; 524/423; 524/495; 524/795; 428/688; 428/694; 428/902
(58) Field of Search .................... 524/423, 495, 524/497, 520, 795, 805; 428/688, 694, 902

(56) References Cited

U.S. PATENT DOCUMENTS

| | | | | |
|---|---|---|---|---|
| 4,163,742 | * | 8/1979 | Mansure | 260/42.17 |
| 4,435,160 | * | 3/1984 | Randlev | 433/9 |
| 5,236,963 | * | 8/1993 | Jackoby et al. | 521/92 |
| 5,292,137 | * | 3/1994 | Simmons et al. | 277/1 |
| 5,300,366 | * | 4/1994 | Nakamaru et al. | 428/549 |
| 5,433,870 | * | 7/1995 | Nakamaru et al. | 252/12.4 |
| 5,502,097 | * | 3/1996 | Saito | 524/398 |
| 5,962,376 | * | 10/1999 | Yamazaki et al. | 508/106 |

FOREIGN PATENT DOCUMENTS

| | | | |
|---|---|---|---|
| 1-233150 | | 9/1989 | (JP). |
| 04072345 | * | 7/1990 | (JP). |
| 02291926 | * | 10/1990 | (JP). |
| 5-239440 | | 9/1993 | (JP). |
| 6-184385 | | 7/1994 | (JP). |

* cited by examiner

*Primary Examiner*—Edward J. Cain
*Assistant Examiner*—Katarzyna Lee Wyroubolin
(74) *Attorney, Agent, or Firm*—Wenderoth, Lind & Ponack L.L.P.

(57) ABSTRACT

A resin composition which exhibits good sealability while keeping creep deformation to a minimum when brought into sliding contact with a mating member at a high contact pressure of over 10 MPa, and which will not damage a mating member made from an aluminum alloy while sliding in contact with lubricating oil. The resin composition is a pressure-resistant, sliding tetrafluoroethylene resin composition containing 100 parts by volume of a modified tetrafluoroethylene resin in the form of a copolymer of tetrafluoroethylene and partially modified tetrafluoroethylene, 5–40 parts by volume of carbon fiber, and 2–30 parts by volume of calcium sulfate whiskers having a Mohs hardness of 4 or less, and having, at 100° C., a maximum deformation rate in 24 hours, of 15% or less. A seal device to be brought into slide contact with an aluminum metal is molded from such a pressure-resistant, sliding tetrafluoroethylene resin composition.

11 Claims, No Drawings

PRESSURE-RESISTANT, SLIDING TETRAFLUOROETHYLENE RESIN COMPOSITION

BACKGROUND OF THE INVENTION

This invention relates to a pressure-resistant, sliding tetrafluoroethylene resin composition used as material for a seal ring, and a seal device to be brought into sliding contact with an aluminum metal.

A material molded from a composition composed mainly of tetrafluoroethylene resin (hereinafter abbreviated to "PTFE") is used widely as material for sliding seal devices such as seal rings due to its low elastic modulus, ease of handling, stable sealing properties, and low and stable dynamic friction coefficient.

According to the environment in use and the material of the mating member, such sliding seal devices molded from PTFE may contain various additives, typically glass fiber, carbon fiber, graphite, mica and talc.

For example, unexamined Japanese patent publication 1-233150 proposes to mix a thermoplastic polyimide in PTFE, the main component, to improve the creep resistance of PTFE and further add glass fiber, glass beads or graphite to the mixture.

Various similar attempts to improve the creep resistance of PTFE have been made. Such attempts include adding a tetrafluoroethylene-fluoroalkylvinylether copolymer (PFA) or a tetrafluoroethylene-hexafluoropropylene copolymer (FEP), which are both superior in creep resistance to PTFE. But it only slightly improved the creep resistance. It failed to improve the creep resistance of PTFE to a level comparable to that of PFA and FEP.

It is also possible to increase the elastic modulus and improve, to a certain degree, the creep resistance by adding a fibrous filler such as glass fiber or carbon fiber, and a flaky filler such as graphite, mica or talc to a main component consisting of a partially modified tetrafluoroethylene copolymer, alias modified PTFE resin, which is a copolymer of tetrafluoroethylene and partially modified tetrafluoroethylene (unexamined Japanese patent publication 5-239440).

If a seal device made from such a partially modified PTFE resin composition containing the above-described fillers is brought into sliding contact with a mating member made from an aluminum alloy under high contact pressure, the sliding surface of the mating member tends to be damaged and worn abnormally. Trials were made to reduce the contents of fillers to avoid this problem. But it resulted in a lowering of the creep resistance and wear resistance.

Aromatic polyamide fibers (aramide fibers) will not damage an aluminum alloy member, but they have no effect in improving the creep resistance. Unexamined Japanese patent publication 6-184385 proposes to add whiskers that are low in Mohs hardness to a resin to prevent sliding wear of an aluminum alloy member. But such whiskers cannot sufficiently reinforce the resin, so that the resin composition tends to suffer heavy creep deformation and wear when brought into sliding contact with a mating member at high temperature and high contact pressure.

The properties required for apparatuses having sliding seal devices such as seal rings include compactness, high performance and smooth sliding of the seal device relative to a mating member even under high pressure.

Specifically, in a heat engine that uses a substitute freon as its refrigerant, the vapor pressure of the refrigerant was 1 MPa to 1.7 MPa at normal temperature and 5 MPa at temperatures higher than 100° C. The water pressure in the pipes leading from a water tank on the rooftop of a high-rise building can reach as high as a few times the water pressure in similar pipes of low buildings. Hydraulic systems of today's automobiles are subjected to larger loads than ever before. In particular, due to recent relaxation of the regulation on vehicle weights, the required contact pressure of the seal devices in hydraulic power steering units in today's trucks can reach as high as more than 14 MPa.

But seal rings and other seal devices made from PTFE resins having conventional compositions such as described above are too large in creep deformation to exhibit required sealability under high pressure. They also tend to be worn abnormally due to creep deformation in a shearing direction.

In hydraulic units for trucks and buses, seal devices are undoubtedly subjected to such creep deformation because sealability is required at high temperatures around 100° C.

For sealing devices such as seal rings mounted in hydraulic cylinders, either the shaft or the cylinder is formed from an aluminum alloy for easy machining and reduced weight. In such a seal device, the aluminum surface, which slides in contact with lubricating oil, is more likely to be damaged than a surface that slides in a non-lubricated (dry friction) state.

This is because lubricants in the PTFE composition do not transfer to the mating member, as is usually the case with a dry frictional surface, if no sufficient lubricating oil is supplied to the sliding surfaces due to high contact pressure or if for some unknown reason, an extremely thin film of oil is formed on the sliding surfaces. If this happens, neither solid nor liquid lubricants can be supplied onto the sliding surfaces, thus causing wear damage to the aluminum metal.

With a compressor for compressing various gases such as a refrigerant as a substitute for fleon, air, helium and natural gas, even if it is intended to be used at normal temperature under a contact pressure below 10 MPa, sliding surface temperature and atmospheric temperature may rise to over 100° C. due to frictional heat of unlubricated seals. In such a case, the unlubricated seals may fail to reveal sufficient sealing properties due to creep deformation.

Especially if the mating members to be brought into sliding contact with the seals are made of a stainless steel having a low thermal conductivity, the sliding surface temperature and atmospheric temperature tend to rise excessively due to heat accumulation by the stainless steel though the lubricative substance transfers to the mating member. If the mating members are made of an aluminum alloy having a corrosion-resistant coating, no transfer occurs because the surface roughness is small. Thus, not only the coating but the aluminum alloy substrate may be damaged.

An object of this invention is to provide a pressure-resistant, sliding tetrafluoroethylene resin composition which exhibits a good sealability while keeping creep deformation to a minimum when brought into sliding contact with a mating member at a high surface pressure of over 10 MPa, and which will not damage a mating member made from an aluminum alloy while sliding in contact with lubricating oil.

Another object of this invention is to provide a tetrafluoroethylene resin composition which is small in creep deformation under unlubricated friction under a contact pressure not less than 4 MPa at normal temperature so that it can reveal sufficient sealing properties, and which will not damage the sliding surface even when brought into sliding contact with an aluminum alloy having a coating or a stainless steel.

SUMMARY OF THE INVENTION

According to this invention, there is provided a pressure-resistant, sliding tetrafluoroethylene resin composition comprising 100 parts by volume of a modified tetrafluoroethylene resin which is a copolymer of tetrafluoroethylene and partially modified tetrafluoroethylene, 5–40 parts by volume of carbon fiber, and 2–30 parts by volume of whiskers having a Mohs hardness of 4 or less. The invention also provides a seal device to be brought into slide contact with an aluminum metal, the seal device being molded from the above-mentioned pressure-resistant, sliding tetrafluoroethylene resin composition. At 100° C., the pressure-resistant, sliding tetrafluoroethylene resin composition of the invention has a maximum deformation rate which shows the compressive creep characteristic under ASTM D621, of 15% or less.

The modified tetrafluoroethylene resin used in the invention may be a modified tetrafluoroethylene resin expressed by the following formula (I):

(1)

(where m and n are integers that satisfy the relation m>n, X is a side-chain group having a perfluoroalkylether group, a fluoroalkyl group or another fluoroalkyl)

The carbon fiber used in the invention preferably has a fiber length of 0.05–1 mm and an aspect ratio of 5–80. Preferable whiskers used in the invention are zinc oxide whiskers or calcium sulfate whiskers.

The modified tetrafluoroethylene resin used in this invention is a copolymer of tetrafluoroethylene and partially modified tetrafluoroethylene. Such a partially modified tetrafluoroethylene copolymer has its modified portions protruding from the TFE molecular structure. These portions serve as a kind of barbs, making the molecular chains less likely to slide relative to each other than with ordinary (unmodified) PTFE. The resin composition is thus high in strength, elastic modulus and creep resistance.

According to this invention, carbon fiber and whiskers having a predetermined hardness are used in combination as fibrous reinforcing materials. The carbon fiber macroscopically reinforces the entire modified PTFE, while the whiskers microscopically reinforce the portions between the fibers. These two kinds of reinforcing materials make up for each other's weak points, thus improving the creep resistance and wear resistance of the composition in cooperation with each other.

The modified tetrafluoroethylene resin used in this invention is a copolymer expressed by the formula (1). This resin is a PTFE modified to such an extent that it retains the properties inherent to PTFE and does not acquire melt moldability, and has different comonomers from those of a melt-moldable, thermoplastic fluororesin formed by modifying PTFE to a greater degree, such as a tetrafluoroethylene-hexafluoropropylene copolymer (FEP) or a tetrafluoroethylene-fluoroalkylvinylether copolymer (PFA).

That is, m and n in Formula (1), which represent the composition of comonomers forming modified tetrafluoroethylene resin, satisfy the relation m>n. In order that this resin retains the properties inherent to PTFE, m has to be sufficiently greater than n. If the relation m>n of such a partially modified tetrafluoroethylene resin is expressed in terms of modified amount, it will be 0.01–0.5 wt %. X in Formula (1) is a monohydric group copolymerizable with TFE. This group is not limited so long as it does not thermally decompose at the molding temperature. For example, side-chain groups having perfluoroalkylether groups expressed by —O-Rf (Rf: perfluoroalkyl group), fluoroalkyl groups such as those represented by —CF3, or other fluoroalkyls.

Such a modified tetrafluoroethylene resin may be manufactured by suspension polymerization used for the polymerization of molding powder or emulsion polymerization used for the polymerization of fine powder. Its molecular weight is preferably a half million to 10 million, more preferably from one to seven million.

Commercially available modified tetrafluoroethylene resins that satisfy these requirements include TEFLON TG-70J made by Du-pont-mitsui Fluorochemicals, POLYFLON M111 and POLYFLON M112 made by DAIKIN KOGYO and HOSTAFLON TFM1600 and TFM1700 made by Hoechst.

The carbon fiber used in this invention may be either pitch carbon fiber or PAN carbon fiber. Carbide fiber calcined at around 1000° C. is preferable to graphitized fiber formed by calcining at 2000° C. or higher, because the former is less likely to wear and damage the mating member made from an aluminum alloy. The carbon fiber should have a fiber length of 0.05–1 mm, preferably 0.05–0.2 mm, a diameter not more than 20 μm, preferably 7–15 μm, and an aspect ratio of 5–80, preferably 5–30. If its fiber length and/or diameter is below the above range, carbon fiber could not reinforce the substrate enough to increase its creep resistance and wear resistance. Carbon fiber having a fiber length and/or a diameter larger than the above range would impair moldability and be more likely to wear and damage the mating aluminum alloy.

Commercially available carbon fiber that satisfy these requirements include KURECA MILLED M101S, M107S, M201S, M207S made by Kureha Chemical KOGYO and DONA CARBO S241, S244, SG241 and SG244 made by Osaka Gas Chemicals as pitch carbon fiber; and BESFIGHT HTA-CMF0160-OH and HTA-CMF0070-OH made by Toho Rayon and TORAYCA MLD-30 and MLD-100 made by Toray as PAN carbon fiber.

Whiskers having a Mohs hardness not less than 4 and usable in this invention include calcium sulfate whiskers, potassium titanate whiskers, zinc oxide whiskers and magnesium sulfate whiskers. In view of possible damage to the mating aluminum alloy due to sliding friction, whiskers having a Mohs hardness of 3 or less are preferable.

Preferably, the whiskers are slightly shorter in fiber length than carbon fiber, i.e. around 50 μm in length. Whiskers far shorter than carbon fiber could not increase the creep resistance and wear resistance of the composition sufficiently.

By adding such whiskers and carbon fiber to the PTFE composition, the carbon fiber reinforces the matrix by forming a relatively coarse network, while the whiskers reinforce the matrix microscopically as if threading through the network of carbon fiber, thus dramatically increasing the creep resistance and wear resistance of the composition. Since the whiskers are smaller than the carbon fiber, they exist in a greater ratio on the frictional surface. Thus, the whiskers having a predetermined Mohs hardness bear most of the frictional shearing force at the frictional surface, so that the mating aluminum alloy (such as a diecast aluminum alloy stipulated under JIS H2118) is less likely be worn and damaged.

Whiskers that satisfy these requirements include anhydrous salt type and semihydrous type calcium sulfate whiskers. The former is preferable. Commercial whiskers usable in this invention are listed below.

[Calcium Sulfate Whiskers]
  FLANKLIN fiber (anhydrous salt type)
  FLANKLIN fiber (semihydrous salt type) both made by Dainichiseika Color & Chemicals Mfg. (Mohs hardness: 2–3, fiber length: 50–60 $\mu$m)
[Potassium Titanate Whiskers]
  TISMO N made by Otsuka Chemical (Mohs hardness: 4, fiber length: 10–20 $\mu$m)
  TIBREX 7 made by Kawatetsu Mining (Mohs hardness: 4, fiber length: 20 $\mu$m)
[Zinc Oxide Whiskers]
  zinc oxide whisker made by Matsushita Electric Industry (Mohs hardness: 4, fiber length: 2–50 $\mu$m)
[Magnesium Sulfate Whiskers]
  MOSHIGE made by Ube Kosan (Mohs hardness: 2.5, fiber length: 10–30 $\mu$m)

As described earlier, carbon fiber is added by 5–40 parts by volume to 100 parts by volume of a modified PTFE resin. Whiskers having a Mohs hardness not exceeding 4 is added by 2–30 parts by volume.

This is because if the content of carbon fiber is greater than 40 parts by volume, carbon fiber will make molding difficult and increase the possibility of wearing and damaging the mating aluminum metal. But if it is less than 5 parts by volume, it will be impossible to reinforce the composition sufficiently to increase its creep resistance and wear resistance.

If the whisker content is greater than 30 parts by volume, whiskers will worsen moldability of the composition and lower the wear resistance. If it is below 2 parts by volume, it will be impossible to sufficiently reinforce the composition and improve the sliding properties. Also, the mating aluminum metal is more likely be worn and damaged.

The composition may further contain known resin additives such as listed below, provided that the additives do not mar the effects of the present invention.

(1) wear reinforcing agents: PTFE lubricating powder, molybdenum disulfide
(2) electrical characteristic improvers: carbide powder, zinc oxide, titanium oxide, etc.
(3) cracking characteristic improver: graphite
(4) thermal conductivity improvers: graphite, metallic oxide powder
(5) toughness improvers: PFA, FEP.

Any known mixing and kneading means may be used to mix and knead these raw materials. only powder materials are dry-mixed together in a Henschel mixer, ball mixer, ribbon blender, Lodig mixer or ultra-Henschel mixer. Preferably, the mixture thus obtained is then pelletized to a predetermined pellet size corresponding to the molding method by e.g. a wet method.

A seal device to be brought into sliding contact with an aluminum metal may be molded from the pressure-resistant, sliding tetrafluoroethylene resin composition according to this invention by any of the conventional molding methods, such as free baking method, hot molding method, isostatic molding, continuous ram extrusion, paste extrusion method and direct molding.

The pressure-resistant, sliding tetrafluoroethylene resin composition according to this invention can be advantageously used as materials for seals in compressors in which is used a substitute refrigerant for fleon, a high-water-pressure seals for high-rise buildings such as high-rise condos and public buildings, and power steering seals for trucks, buses and other automobiles, as well as for seal bearings of construction machinery such as shovel cars, forklifts, bulldozer and pile drivers. If safety is particularly important, the resin composition of the invention may be used only for seal devices used at load pressures not exceeding 10 MPa at 100° C. Needless to say, the resin composition according to the invention can also be used as a material for a seal device to be brought into sliding contact with a material harder than an aluminum alloy, such as steel and cast iron.

EXAMPLES

The raw materials used in Examples of the invention and Comparative Examples are listed below. The numbers in brackets correspond to the material numbers in the tables.

(1) Modified tetrafluoroethylene resin-1 [modified PTFE-1]
  TEFLON TG70J made by Pont-Mitsui Fluorochemicals
(2) Modified tetrafluoroethylene resin-2 [modified PTFE-2]
  POLYFLON M111 made by DAIKIN KOGYO
(3) Tetrafluoroethylene resin [PTFE]
  TEFLON 7J made by Pont-Mitsui Fluorochemicals
(4) Tetrafluoroethylene-fluoroalkylvinylether copolymer [PFA]
  PFA MP10 made by Pont-Mitsui Fluorochemicals
(5) Carbon fiber (pitch) –1 [CF-1]
  KURECA MILLED M101S made by Kureha Chemical Kogyo (fiber length: 100 $\mu$m, fiber diameter: 14.5 $\mu$m)
(6) Carbon fiber (PAN) –2 [CF-2]
  BESFIGHT HTA-CMF0160-OH made by Toho Rayon (fiber length: 160 $\mu$m, fiber diameter: 7 $\mu$m)
(7) Carbon fiber (pitch) –3 [CF-3]
  KURECA MILLED M107S made by Kureha Chemical Kogyo (fiber length: 700 $\mu$m, fiber diameter: 14.5 $\mu$m)
(8) Carbon fiber (pitch) –4 [CF-4]
  KURECA MILLED M101T made by Kureha Chemical Kogyo (fiber length: 100 $\mu$m, fiber diameter: 18 $\mu$m)
(9) Calcium sulfate whisker [calcium sulfate W]
  FLANKLIN fiber A30 (anhydrous salt type) made by Dainichiseika Color & Chemicals Mfg.
  (Mohs hardness: 2–3, fiber length: 50–60 $\mu$m)
(10) Zinc oxide whisker [zinc oxide W]
  Zinc oxide whisker made by Matsushita Electric Industry
  (Mohs hardness: 4, fiber length: 2–50 $\mu$m)
(11) Potassium titanate whisker [potassium titanate W]
  TISMO N made by Otsuka Chemical
  (Mohs hardness: 4, fiber length: 10–20 $\mu$m)
(12) Graphite, made by Nippon Graphite Industries: ACP
(13) Aluminum borate whisker [aluminum borate W]
  ALBOREX Y made by Shikoku Kasei Kogyo
  (Mohs hardness: 7, fiber length: 10–30 $\mu$m)
(14) Glass fiber
  MF-KAC made by Asahi Fiber Glass Examples 1–9 of the Invention and Comparative Examples 1–13

Raw materials shown in Tables 1 and 2 were dry-mixed together at the ratios shown in Tables 1 and 2 in a Henschel dry mixer, and the mixture was shaped by a press into rods 30 (mm)dia.×100 (mm) and cylindrical members 124 (outer dia.)×64 (inner dia.)×100 (mm), which were then calcined for four hours at 370° C. by free baking method. The thus calcined members were cut to ring-shaped test pieces measuring 17 dia.×21 dia.×100 (mm) for frictional wear test and test pieces compression creep test measuring 12.7×12.7×12.7 (mm). Cylindrical materials were skived to test pieces for measuring general physical properties measuring 1×80×1000 (mm).

As frictional wear tests, (1) an oil lubricated frictional wear test and (2) an unlubricated frictional wear test were conducted. In test (1), a thrust type tester was used, and the test was conducted by keeping the test pieces in sliding contact with mating members made of aluminum alloy (ADC12: JIS H2118, type 12) immersed in ATF oil kept at 100° C. for 10 hours, with the peripheral speed kept at 6 m/min. and the contact pressure at 12 MPa. Tables 3 and 4 show the dynamic friction coefficient, the weight of wear of each test piece and the weight of wear of each mating member, immediately before the end of the test.

In the unlubricated frictional wear test, a thrust tester was used, and the test was conducted by keeping the test pieces in sliding contact with mating members or hard alumite (with A5056 substrate) with the peripheral speed at 32 m/min. and the contact pressure at 4 MPa for 20 hours in the atmosphere. Table 5 shows the dynamic friction coefficient, weight of wear of each test piece and weight of wear of each mating member immediately before the end of the test.

The compressive creep test was conducted under ASTM D621 by compressing the test pieces under contact pressure of 140 $kgf/cm^2$ at normal temperature and at 100° C. Measurement was made of the maximum deformation rate (%) when 24 hours passed and the deformation rate (permanent deformation rate: %) when another 24 hours passed.

Tensile strength and elongation at break were also measured under ASTM D1708 and are shown in Tables 3 and 4.

As shown in Tables 3 and 4, there were none in the test pieces of Examples of the invention that showed a compressive creep characteristic under ASTM D621, i.e. maximum deformation rate in 24 hours, higher than 15%. Also, any of them scarcely damaged the mating members (ADC12) in oil. They were low in frictional properties and high in wear resistance.

In contrast, Comparative Examples 2–5 and 8, in which carbon fiber or other filler was added to modified PTFE severely damaged the mating members in the frictional wear test, though their maximum deformation rates were all below 15%. Comparative Example 7, in which the carbon fiber content was too low, was inferior in wear resistance and creep resistance, though no damage was to the mating member.

As will be apparent from Table 5, the compositions of Examples 2, 3, 6 and 8 scarcely damaged the mating members (hard alumite) during the unlubricated friction wear test, and also high in wear resistance.

In contrast, Comparative Example 6, in which calcium sulfate whiskers were added, was inferior in wear resistance, though the mating member was scarcely damaged. For Comparative Examples 4 and 5, both the resin members and the mating members showed large weight of wear.

According to this invention, the resin composition suffers little creep deformation, while maintaining good sealing properties, even when the composition is brought into sliding contact with a mating member at a high contact pressure exceeding 10 MPa. Further, the resin composition of the invention has an advantage that it is a pressure-resistant, sliding tetrafluoroethylene resin composition that never wears and damages a mating member of aluminum alloy.

As will be apparent from Table 5, the compositions of Examples 2, 3, 6 and 8 scarcely damaged the mating members (hard alumite) during the unlubricated friction wear test, and also high in wear resistance.

TABLE 1

| Ratio (in vol part) | Number | \multicolumn{11}{c|}{Examples} |
| --- | --- | --- | --- | --- | --- | --- | --- | --- | --- | --- | --- | --- |
|  |  | 1 | 2 | 3 | 4 | 5 | 6 | 7 | 8 | 9 | 10 | 11 |
| (1) Modified PTFE-1 |  | 100 | 100 | 100 | 100 | 100 | 100 | — | 100 | 100 | 100 | 100 |
| (2) Modified PTFE-2 |  | — | — | — | — | — | — | 100 | — | — | — | — |
| (5) CF-1 |  | 5 | 20 | 20 | 30 | 40 | — | 20 | 20 | 20 | — | — |
| (6) CF-2 |  | — | — | — | — | — | 20 | — | — | — | — | — |
| (7) CF-3 |  | — | — | — | — | — | — | — | — | — | 20 | — |
| (8) CF-4 |  | — | — | — | — | — | — | — | — | — | — | 20 |
| (9) Calcium sulfate W |  | 2 | 10 | 30 | 20 | 2 | 10 | 10 | — | — | 10 | 10 |
| (10) Zinc oxide W |  | — | — | — | — | — | — | — | 10 | — | — | — |
| (11) Potassium titanate W |  | — | — | — | — | — | — | — | — | 10 | — | — |

TABLE 2

| Ratio (in vol part) | Number | \multicolumn{13}{c|}{Comparative Examples} |
| --- | --- | --- | --- | --- | --- | --- | --- | --- | --- | --- | --- | --- | --- | --- |
|  |  | 1 | 2 | 3 | 4 | 5 | 6 | 7 | 8 | 9 | 10 | 11 | 12 | 13 |
| (1) Modified PTFE-1 |  | 100 | 100 | 100 | 100 | 100 | 100 | 100 | 100 | 100 | — | — | — | — |
| (3) PTFE |  | — | — | — | — | — | — | — | — | — | 100 | 100 | 100 | 100 |
| (4) PFA |  | — | — | — | — | — | — | — | — | — | — | — | 30 | 30 |
| (5) CF-1 |  | — | 10 | 30 | 10 | 20 | — | 3 | 45 | — | 30 | — | 30 | 20 |
| (9) Calcium sulfate W |  | — | — | — | — | — | 20 | 1 | 35 | — | — | — | — | 10 |
| (12) Graphite |  | — | — | — | 10 | — | — | — | — | — | — | — | — | — |
| (13) Aluminum borate W |  | — | — | — | — | 10 | — | — | — | — | — | — | — | — |
| (14) Glass fiber |  | — | — | — | — | — | — | — | — | 30 | — | 30 | — | — |

TABLE 3

| Item | Number | 1 | 2 | 3 | 4 | 5 | 6 | 7 | 8 | 9 | 10 | 11 |
|---|---|---|---|---|---|---|---|---|---|---|---|---|
| | | | | | | Examples | | | | | | |
| Lubricated friction wear test | | | | | | | | | | | | |
| Dynamic friction coefficient | | 0.08 | 0.09 | 0.09 | 0.08 | 0.10 | 0.09 | 0.10 | 0.10 | 0.09 | 0.10 | 0.09 |
| Amount of wear (mg) | | | | | | | | | | | | |
| Resin member | | 22 | 15 | 10 | 9 | 30 | 18 | 15 | 22 | 27 | 40 | 32 |
| Mating member | | 0.3 | 0.2 | 0.1 | 0.1 | 0.9 | 0.3 | 0.2 | 0.5 | 0.6 | 1.5 | 0.9 |
| Compressive creep test | | | | | | | | | | | | |
| Max deformation rate (%) at normal temp | | 6.0 | 3.7 | 3.5 | 2.4 | 2.2 | 3.8 | 3.8 | 3.9 | 4.2 | 3.6 | 3.7 |
| Permanent deformation rate | | 2.7 | 2.0 | 1.8 | 1.1 | 1.0 | 2.0 | 2.1 | 2.1 | 2.4 | 2.0 | 2.1 |
| Max deformation rate (%) at 100° C. | | 14.7 | 12.7 | 12.5 | 10.7 | 10.4 | 12.8 | 12.6 | 12.8 | 13.1 | 12.2 | 12.7 |
| Permanent deformation rate | | 8.6 | 7.1 | 6.8 | 5.5 | 5.0 | 7.1 | 7.0 | 7.2 | 7.6 | 6.9 | 7.3 |
| Tensile strength (MPa) | | 250 | 160 | 150 | 130 | 120 | 158 | 157 | 162 | 160 | 122 | 154 |
| Elongation (%) | | 320 | 142 | 110 | 90 | 77 | 140 | 138 | 135 | 140 | 80 | 142 |

TABLE 4

| Item | Number | 1 | 2 | 3 | 4 | 5 | 6 | 7 | 8 | 9 | 10 | 11 | 12 | 13 |
|---|---|---|---|---|---|---|---|---|---|---|---|---|---|---|
| | | | | | | | Comparative Examples | | | | | | | |
| Lubricated friction wear test | | | | | | | | | | | | | | |
| Dynamic friction coefficient | | 0.06 | 0.07 | 0.06 | 0.08 | 0.06 | 0.07 | 0.08 | 0.06 | 0.07 | 0.06 | 0.08 | 0.07 | 0.06 |
| Amount of wear (mg) | | | | | | | | | | | | | | |
| Resin member | | 1500 | 112 | 410 | 93 | 90 | 250 | 100 | 400 | 910 | 422 | 960 | 400 | 12 |
| Mating member | | 0.1 | 14 | 63 | 12 | 11 | 0.1 | 0.2 | 60 | 89 | 67 | 93 | 61 | 0.3 |
| Compressive creep test | | | | | | | | | | | | | | |
| Max deformation rate (%) at normal temp | | 8.5 | 6.0 | 3.0 | 5.0 | 4.0 | 7.7 | 8.1 | 2.4 | 6.9 | 7.2 | 8.1 | 6.7 | 6.9 |
| Permanent deformation rate | | 3.1 | 2.5 | 1.4 | 2.2 | 2.3 | 2.9 | 3.0 | 1.1 | 2.8 | 2.7 | 4.6 | 2.5 | 2.4 |
| Max deformation rate (%) at 100° C. | | 24.1 | 14.5 | 12.0 | 14.2 | 12.9 | 22.2 | 21.0 | 9.7 | 19.9 | 30.1 | 36.6 | 25.3 | 26.0 |
| Permanent deformation rate | | 12.8 | 8.6 | 7.1 | 7.9 | 7.5 | 12.1 | 11.1 | 7.0 | 10.9 | 16.3 | 18.2 | 13.0 | 13.8 |
| Tensile strength (MPa) | | 290 | 175 | 150 | 157 | 158 | 172 | 270 | 130 | 160 | 162 | 171 | 160 | 132 |
| Elongation (%) | | 440 | 270 | 120 | 183 | 142 | 185 | 365 | 45 | 150 | 132 | 165 | 117 | 90 |

TABLE 5

| | | Examples | | | | Comparative Examples | | | |
|---|---|---|---|---|---|---|---|---|---|
| Item | Number | 2 | 3 | 6 | 8 | 3 | 4 | 5 | 6 |
| Unlubricated friction wear test | | | | | | | | | |
| Dynamic friction coefficient | | 0.12 | 0.14 | 0.13 | 0.13 | 0.18 | 0.12 | 0.13 | 0.12 |
| Amount of wear (mg) | | | | | | | | | |
| Resin member | | 10 | 9 | 12 | 15 | 58 | 37 | 29 | 47 |
| Mating member | | 2.2 | 1.5 | 2.0 | 2.5 | 8.0 | 3.5 | 4.0 | 1.8 |

What is claimed is:

1. A seal ring to be brought into slide contact with an aluminum metal, said seal device being molded from a pressure-resistant, sliding tetrafluoroethylene resin composition comprising 100 parts by volume of a modified tetrafluoroethylene resin which is a copolymer of tetrafluoroethylene and partially modified tetrafluoroethylene, 5–40 parts by volume of carbon fiber, and 2–30 parts by volume of whiskers having a Mohs hardness of 4 or less.

2. A seal ring to be brought into slide contact with an aluminum metal said seal device being molded from a pressure-resistant, sliding tetrafluoroethylene resin composition comprising 100 parts by volume of a modified tetrafluoroethylene resin which is a copolymer of tetrafluoroethylene and partially modified tetrafluoroethylene, 5–40 parts by volume of carbon fiber, and 2–30 parts by volume of whiskers having a Mohs hardness of 4 or less, and having, at 100° C., a maximum deformation rate in 24 hours, of 15% or less which shows the compressive creep characteristic under ASTM D621.

3. A seal ring as claimed in claim 1 or 2 wherein said modified tetrafluoroethylene resin is a modified tetrafluoroethylene resin expressed by the following formula:

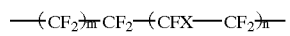

(wherein m and n are integers that satisfy the relation m>n, X is a side-chain group having a perfluoroalkylether group, a fluoroalkyl group or another fluoroalkyl).

4. A seal ring as claimed in claim 1 or 2 wherein said carbon fiber has a fiber length of 0.05–1 mm and an aspect ratio of 5–80.

5. A seal ring as claimed in claim 1 or 2 wherein said whiskers are calcium sulfate whiskers.

6. A seal ring as claimed in claim 1 or 2 wherein said whiskers are zinc oxide whiskers.

7. A seal ring as claimed in claim 3 wherein said carbon fiber has a fiber length of 0.05–1 mm and an aspect ratio of 5–80.

8. A seal ring as claimed in claim 3 wherein said whiskers are calcium sulfate whiskers.

9. A seal ring as claimed in claim 4 wherein said whiskers are calcium sulfate whiskers.

10. A seal ring as claimed in claim 3 wherein said whiskers are zinc oxide whiskers.

11. A seal ring as claimed in claim 4 wherein said whiskers are zinc oxide whiskers.

* * * * *